United States Patent Office 3,265,668
Patented August 9, 1966

3,265,668
REACTION PRODUCTS OF AMINO-s-TRIAZINE AND ALKYLENE CARBONATES
Rostyslaw Dowbenko and Roger M. Christenson, Gibsonia, Pa., assignors to Pittsburgh Plate Glass Company, Pittsburgh, Pa., a corporation of Pennsylvania
No Drawing. Filed Apr. 5, 1963, Ser. No. 270,795
17 Claims. (Cl. 260—77.5)

This invention relates to the novel reaction products of amino-s-triazines and a compound containing a carbonyldioxy group

and to methods of preparing said novel reaction products.

More specifically, this invention relates to the reaction of amino-s-triazines having the structure (I)
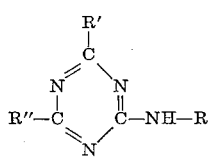

wherein R is hydrogen or an alkyl or aryl group, preferably containing 1 to 10 carbon atoms, and R' and R" are hydrogen or an amino, alkylamino, arylamino, alkyl, alkoxyalkyl, alkenyl or aryl group, wherein the hydrocarbon portion of any group preferably contains 1 to 10 carbon atoms, with an alkylene carbonate having the structure (II)
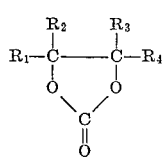

wherein $R_1$, $R_2$, $R_3$ and $R_4$ are hydrogen or alkyl, alkaryl, or aryl groups, preferably containing 1 to 10 carbon atoms, to produce novel resinous hydroxyl-containing materials.

It has now been discovered that the novel resinous materials described hereinabove can be prepared simply and efficiently by the reaction of an amino-s-triazine and a compound containing a carbonyldioxy group. The reaction is believed to take place substantially as follows wherein melamine and ethylene carbonate are used for illustrative purposes:

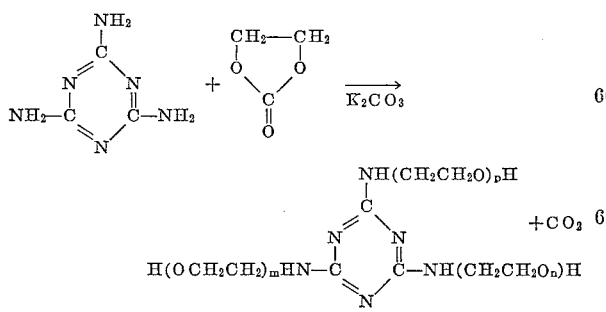

wherein either $m$, $n$ or $p$ may be a number from 0 to about 20 and $m+n+p$ is a number from 3 to about 40. The reaction is believed to occur between the alkylene carbonate and the reactive hydrogen of an amino, alkylamino or arylamino group. The amino group has two reactive hydrogens, thus it is possible to prepare resins having a functionality greater than the number of amino groups present. Also, it is believed that the primary amine hydrogens are more reactive than secondary amine hydrogens and that the reaction preferentially occurs with primary amine hydrogens. The reaction occurs whenever the reactants are brought into effective contact at a temperature of about 75° C. to about 250° C. in the presence of a base. Temperatures in excess of 250° C. may also be utilized, particularly if the reaction is conducted under pressure. One preferred method of preparing the novel hydroxyl-containing materials of this invention, however, comprises admixing an amino-s-triazine and an alkylene carbonate at temperatures of about 120° C. to about 150° C., or higher, in the presence of a base.

The ratio of one reactant to another is not critical and equimolar amounts, or excesses of either reactant may be effectively utilized. The characteristics of the reaction product vary somewhat with variations in the ratio of reactants; thus, for example, when only a slight excess of the alkylene carbonate reactant is utilized as in Example I below, a solid resin having a relatively low hydroxyl number is obtained, whereas a large excess of the same reactant, Example III, Reaction D, produces an oily reaction product having a substantially higher hydroxyl number.

As mentioned above, the ratio of reactants is not critical, however, one useful process comprises reacting an alkylene carbonate with an amino-s-triazine in the molar ratios of about 1:1 to about 40:1, or higher. Equimolar or extramolar quantities of the alkylene carbonate reactant are generally preferred inasmuch as the alkylene carbonate reactant, which is liquid at the reaction temperature, acts as a solvent for the triazine, thereby promoting effective contact between the reactants.

The reaction, as described hereinabove, is generally carried out in the absence of a solvent medium; however, a mutual solvent may be utilized if desired. A mutual solvent is advantageously utilized in promoting effective contact between the reactants when the triazine reactant is used in excess. The following solvents are representative of ones which may be utilized for this purpose: diethylene glycol dimethyl ether, dimethylformamide, dimethylacetamide, xylene and the like.

As mentioned hereinabove, the reaction between an amino-s-triazine and an alkylene carbonate occurs most efficiently in the presence of a base. The quantity of base utilized can vary from about 0.10 percent by weight of the total weight of the reactants, or less, to about 5 percent by weight of the total weight of the reactants, or more. One preferred method of conducting the desired reaction comprises the utilization of about 0.15 percent by weight to about 1 percent by weight of the total weight of the reactants of a base. This quantity of base is preferred as it efficiently promotes the desired reaction at the reaction conditions disclosed hereinabove, and does not contribute an excess of base to the reaction product. An excess of base in the reaction product could be deleterious in subsequent uses of the reaction product, thereby necessitating purification which is not necessary when the above levels of base are utilized. The following bases are representative of ones which may be utilized for this purpose:

A. Inorganic bases, such as potassium carbonate, sodium carbonate, lithium carbonate, barium carbonate, calcium carbonate, magnesium carbonate, strontium carbonate, sodium hydroxide, potassium hydroxide, barium hydroxide, calcium hydroxide, and the like.

B. Organic bases, such as pyridine, dimethylaniline, tri-n-butylamine, triethylene diamine and the like.

Some amino-s-triazines having the structure represented by Formula I above and utilizable as one of the reactants in the instant invention include:

Melamine,
Monoamino-s-triazine,
2,4-diamino-s-triazine,
2-methyl-4-amino-s-triazine,
2-propyl-4-amino-s-triazine,
2-hexyl-4-amino-s-triazine,
2-decyl-4-amino-s-triazine,
2,4-diethyl-6-amino-s-triazine,
2-ethyl-4-butyl-6-amino-s-triazine,
2,4-dipentyl-6-amino-s-triazine,
2-octyl-4-decyl-5-amino-s-triazine,
2-methyl-4,6-diamino-s-triazine,
2-butyl-4,6-diamino-s-triazine,
2-hexyl-4,6-diamino-s-triazine,
2-dodecyl-4,6-diamino-s-triazine,
2-ethyl-4-methylamino-6-amino-s-triazine,
2-pentyl-4-butylamino-6-amino-s-triazine,
2-octyl-4-octylamino-6-amino-s-triazine,
2-decyl-4-hexylamino-6-amino-s-triazine,
2,4-dimethylamino-6-amino-s-triazine,
2-ethylamino-4-butylamino-6-amino-s-triazine,
2-butylamino-4-octylamino-6-amino-s-triazine,
Methylamino-s-triazine,
Butylamino-s-triazine,
Octylamino-s-triazine,
2-ethylamino-4,6-diamino-s-triazine,
2-hexylamino-4,6-diamino-s-triazine,
2-decylamino-4,6-diamino-s-triazine,
2-dodecylamino-4,6-diamino-s-triazine,
2-ethylamino-4-hexylamino-6-amino-s-triazine,
2-butylamino-4-decylamino-6-amino-s-triazine,
2,4,6-trimethylamino-s-triazine,
2-methylamino-4-propylamino-6-pentylamino-s-triazine,
2,4-dibutylamino-6-octylamino-s-triazine,
2-ethylamino-4-hexylamino-6-decylamino-s-triazine,
2,4-diethyl-6-methylamino-s-triazine,
2-ethyl-4-butyl-6-propylamino-s-triazine,
2-butyl-4-octyl-6-ethylamino-s-triazine,
2-hexyl-4-decyl-6-butylamino-s-triazine,
2-methyl-4,6-dimethylamino-s-triazine,
2-butyl-4-ethylamino-6-hexylamino-s-triazine,
2-octyl-4-ethylamino-6-decylamino-s-triazine,
2-dodecyl-4-butylamino-6-octylamino-s-triazine,
Benzoguanamine,
2,4-diphenyl-6-amino-s-triazine,
2-phenylamino-4,6-diamino-s-triazine,
2,4-diphenylamino-6-amino-s-triazine,
2,4,6-triphenylamino-s-triazine,
2-phenyl-4-methyl-6-amino-s-triazine,
2-phenyl-4-octyl-6-amino-s-triazine,
2-phenyl-4-hexyl-6-methylamino-s-triazine,
2-phenyl-4-octyl-6-phenylamino-s-triazine,
2,4-diphenyl-6-phenylamino-s-triazine,
2,4-diphenyl-6-butylamino-s-triazine,
2-phenyl-4-butylamino-6-amino-s-triazine,
2,4-diphenylamino-6-hexylamino-s-triazine,
2-phenyl-4-octylamino-6-ethylamino-s-triazine,
2-phenyl-4-decylamino-6-phenylamino-s-triazine,
2-phenyl-4,6-diphenylamino-s-triazine,
2-phenyl-4-amino-s-triazine,
2-phenyl-4-hexylamino-s-triazine,
2-phenyl-4-phenylamino-s-triazine,
2-phenyl-4-phenylamino-6-amino-s-triazine,
Phenylamino-s-triazine,
2,4-diphenylamino-s-triazine, and the like.

Some compounds containing a carbonyldioxy group as represented by Formula II above and utilizable as one of the reactants in the instant invention include:

Ethylene carbonate,
Propylene carbonate,
1,2-butylene carbonate,
2,3-butylene carbonate,
1,2-hexylene carbonate,
2,3-hexylene carbonate,
3,4-hexylene carbonate,
1,2-decylene carbonate,
2,3-decylene carbonate,
3,4-decylene carbonate,
4,5-decylene carbonate,
5,6-decylene carbonate,
2,3-dimethyl-2,3-propylene carbonate,
2-methyl-2,3-propylene carbonate,
3-ethyl-3,4-butylene carbonate,
2,3-dimethyl-2,3-butylene carbonate,
4-methyl-4,5-amylene carbonate,
4-propyl-4,5-amylene carbonate,
3,4-dimethyl-3,4-amylene carbonate,
2-butyl-1,2-octylene carbonate,
4,5-dipropyl-4,5-octylene carbonate,
Phenylethylene carbonate,
Tetraphenylethylene carbonate,
1-phenyl-1,2-propylene carbonate,
1-phenyl-1,2-butylene carbonate,
2-phenyl-2,3-amylene carbonate,
2-phenyl-3-ethyl-2,3-amylene carbonate,
2,3-diphenyl-2,3-amylene carbonate,
3,4-diphenyl-3,4-hexylene carbonate,
1,1,2-triphenyl-1,2-hexylene carbonate,
1-(p-tolyl)-1,2-octylene carbonate,
1-(2,3,5,6-tetramethylphenyl)-1,2-ethylene carbonate,
1,2-di(p-tolyl)-1,2-propylene carbonate,
2,3-di(2,4-xylyl)-2,3-butylene carbonate, and the like.

The novel resinous materials of this invention are useful in the preparation of novel polyester resins for coatings, moldings and the like, and are especially useful as a polyhydroxyl material in the preparation of novel urethane foams.

The following examples illustrate in detail the preparation of the novel resinous hydroxyl containing materials of this invention. The examples are not intended to limit the invention, however, for there are, of course, numerous possible variations and modifications.

*Example I*

| | Grams |
|---|---|
| Benzoguanamine (0.2 gram-mole) | 37.4 |
| Ethylene carbonate (0.42 gram-mole) | 37.0 |
| Potassium carbonate | 0.5 |

The above ingredients were admixed in a glass reaction vessel equipped with a stirrer, reflux condenser and thermometer.

The mixture was heated to a temperature of about 150° C. and maintained at that temperature for a period of about 5 hours. Carbon dioxide was evolved while the mixture was being heated, although the evolution diminished as the reaction continued.

The resulting mixture was distilled under vacuum at a temperature of about 150° C. for a period of 3 hours. Fifty-five (55) grams of a tan, solid, resinous material were obtained.

The product had a hydroxyl value of 221.2 and contained 24.52 percent nitrogen.

*Example II*

| | Grams |
|---|---|
| Benzoguanamine (2.5 gram-moles) | 468 |
| Ethylene carbonate (10.0 gram-moles) | 880 |
| Potassium carbonate | 2 |

The above ingredients were admixed in a glass reaction vessel equipped with a stirrer, reflux condenser and thermometer.

The mixture was heated slowly to 100° C. At 82° C. carbon dioxide began to evolve from the reaction mixture. The temperature was maintained at 100° C. for a period of about 1 hour. The temperature of the reaction mixture was subsequently increased to 110° C., 120° C., and 130° C.; being maintained at the 110° C. and 120° C. temperature levels for about 1 hour at each temperature. The reaction mixture was then maintained at 130° C. until the carbon dioxide evolution ceased.

The product, after cooling, was a solid, resinous material containing 19.5 percent nitrogen and having a hydroxyl value of 174.7. The yield was 98.5 percent.

*Example III*

Using a procedure similar to Example I, melamine was reacted with ethylene carbonate at about 140° C. to 150° C. in the presence of potassium carbonate. The following table lists the results which were obtained when various ratios of reactants were utilized. The quantity of product obtained, its hydroxyl value and nitrogen content are based on an unpurified product.

| Reaction | Melamine, Gram-Moles | Ethylene Carbonate, Gram-Moles | Potassium Carbonate, Grams | Product | | | |
|---|---|---|---|---|---|---|---|
| | | | | Description | Yield, Grams | Nitrogen, Percent | Hydroxyl Value |
| A | 0.2 | 0.6 | 0.50 | Tan Resin | 51.5 | 31.11 | 233.4 |
| B | 0.1 | 0.6 | 0.25 | Light Tan Resin | 36.0 | 19.64 | 378.2 |
| C | 0.05 | 0.5 | 0.25 | Tan Resin | 29.1 | 14.41 | 436.4 |
| D | 0.05 | 1.0 | 0.50 | Amber Oil | 53.7 | 7.68 | 425.5 |

*Example IV*

|  | Grams |
|---|---|
| Melamine (0.2 gram-mole) | 24.8 |
| Ethylene carbonate (0.6 gram-mole) | 52.8 |
| Potassium carbonate | 0.5 |

The above ingredients were admixed in a glass reaction vessel equipped with a stirrer, reflux condenser and thermometer.

The mixture was heated to a temperature of about 150° C. and maintained at that temperature until the evolution of carbon dioxide ceased. The reaction mixture was then cooled and an additional 52.8 grams of ethylene carbonate and 0.5 gram of potassium carbonate were added.

The reaction mixture was reheated to about 150° C. and maintained at that temperature until the evolution of carbon dioxide ceased. It was then cooled and an additional 70.5 grams of ethylene carbonate and 0.5 gram of potassium carbonate were added. The temperature was raised to about 150° C. and maintained there until the evolution of carbon dioxide ceased.

One hundred ten (110) grams of a tan semi-solid material were obtained (yield 98 percent). The product contained 14.71 percent nitrogen and had a hydroxyl value of 374.9. The functionality, as determined from these data, was about 3.9.

*Example V*

|  | Grams |
|---|---|
| Melamine (0.1 gram-mole) | 12.4 |
| Ethylene carbonate (0.6 gram-mole) | 52.8 |
| Potassium carbonate | 0.25 |

The above ingredients were admixed in a glass reaction vessel equipped with a stirrer, reflux condenser and thermometer.

The mixture was heated to a temperature of about 150° C. and maintained at that temperature for a period of about 5 hours. Carbon dioxide evolved rapidly during heating. The heat was removed when carbon dioxide evolution ceased.

The resulting product had a hydroxyl value of 393.6 and a nitrogen content of 16.49 percent. Forty and three-tenths (40.3) grams of solid reaction product were recovered.

*Example VI*

|  | Grams |
|---|---|
| Melamine (0.1 gram-mole) | 12.4 |
| Propylene carbonate (0.6 gram-mole) | 61.3 |
| Potassium carbonate | 0.25 |

The above ingredients were admixed in a glass reaction vessel equipped with a stirrer, reflux condenser and thermometer.

The mixture was heated to a temperature of about 170° C. and maintained at that temperature for a period of about 6½ hours. Carbon dioxide evolved rapidly. Heating was discontinued when the carbon dioxide evolution ceased.

The resulting product had a hydroxyl value of 400.7 and a nitrogen content of 17.35 percent. Forty-three (43) grams of solid reaction product were recovered.

*Example VII*

|  | Grams |
|---|---|
| Melamine (0.1 gram-mole) | 12.4 |
| Propylene carbonate (0.6 gram-mole) | 61.3 |
| Potassium hydroxide | 0.25 |

The above ingredients were admixed in a glass reaction vessel equipped with a stirrer, reflux condenser and thermometer.

The mixture was heated to a temperature of about 175° C. for a period of about 8 hours. Carbon dioxide evolved rapidly. Heating was discontinued when the carbon dioxide evolution ceased.

The resulting product had a hydroxyl value of 304.5 and a nitrogen content of 17.09 percent. Forty four and nine-tenths (44.9) grams of solid reaction product were recovered.

*Example VIII*

|  | Grams |
|---|---|
| Melamine (0.1 gram-mole) | 12.4 |
| Ethylene carbonate (0.6 gram-mole) | 52.8 |
| Pyridine | 0.50 |

The above ingredients were admixed in a glass reaction vessel equipped with a stirrer, reflux condenser and thermometer.

The mixture was heated to a temperature of about 150° C. for a period of about 3 hours. Carbon dioxide evolved rapidly. Heating was discontinued when the carbon dioxide evolution ceased.

The resulting product had a hydroxyl value of 357.9 grams and a nitrogen content of 14.66 percent. Forty two and six-tenths (42.6) grams of a solid reaction product were recovered. The functionality, as determined by these data, was about 3.5.

*Example IX*

|  | Grams |
|---|---|
| Benzoguanamine (0.1 gram-mole) | 18.7 |
| Propylene carbonate (0.6 gram-mole) | 61.3 |
| Potassium carbonate | 0.25 |

The above ingredients were admixed in a glass reaction vessel equipped with a stirrer, reflux condenser and thermometer.

The mixture was heated to a temperature of about 165° C. for a period of about 10 hours. Carbon dioxide evolved rapidly. Heating was discontinued when the carbon dioxide evolution ceased.

The resulting product had a hydroxyl value of 158.4 and a nitrogen content of 10.12 percent. Sixty-five (65) grams of solid reaction product were recovered.

*Example X*

|  | Grams |
|---|---|
| Benzoguanamine (0.1 gram-mole) | 18.7 |
| Propylene carbonate (0.6 gram-mole) | 61.3 |
| Potassium hydroxide | 0.25 |

The above ingredients were admixed in a glass reaction vessel equipped with a stirrer, reflux condenser and thermometer.

The mixture was heated to a temperature of about 150° C. for a period of about 12 hours. Carbon dioxide evolved rapidly. Heating was discontinued when the carbon dioxide evolution ceased.

The resulting product had a hydroxyl value of 168.4 and a nitrogen content of 10.25 percent. Sixty-six and two-tenths (66.2) grams of solid reaction product were covered.

While specific examples of the invention have been set forth hereinabove, it is not intended to limit the invention solely thereto, but to include all of the variations and modifications following within the scope of the appended claims.

We claim:

1. The hydroxyl-containing resinous reaction product of an amino-s-triazine and an alkylene carbonate having the structure

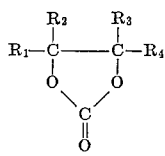

wherein $R_1$, $R_2$, $R_3$ and $R_4$ are members of the class consisting of hydrogen, alkyl, alkaryl, and aryl groups.

2. The hydroxyl-containing resinous reaction product of claim 1 wherein the amino-s-triazine has the structure

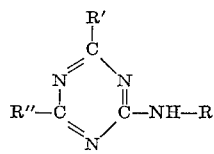

wherein R is a member of the class consisting of hydrogen, alkyl and aryl groups, and R' and R" are members of the class consisting of hydrogen, amino, alkylamino, arylamino, alkyl, and aryl groups.

3. The hydroxyl-containing resinous reaction product of claim 1 wherein the alkylene carbonate is selected from the class consisting of ethylene carbonate and propylene carbonate.

4. The hydroxyl-containing resinous reaction product of claim 2 wherein the alkylene carbonate is selected from the class consisting of ethylene carbonate and propylene carbonate.

5. The hydroxyl-containing resinous reaction product of an amino-s-triazine and an alkylene carbonate selected from the class consisting of ethylene carbonate and propylene carbonate, said reaction product having a hydroxyl number of about 158 to about 436.

6. The hydroxyl-containing resinous reaction product of benzoguanamine and ethylene carbonate.

7. The hydroxyl-containing resinous reaction product of benzoguanamine and propylene carbonate.

8. The hydroxyl-containing resinous reaction product of melamine and ethylene carbonate.

9. The hydroxyl-containing resinous reaction product of melamine and propylene carbonate.

10. A method of preparing the reaction product of claim 1 which comprises admixing the reactants in the presence of a base.

11. A method of preparing the reaction product of claim 1 which comprises heating the admixed reactants to a temperature of about 75° C. to about 225° C. in the presence of a base.

12. A method of preparing the reaction product of claim 4 which comprises heating the admixed reactants to a temperature of about 75° C. to about 225° C. in the presence of a base selected from the class consisting of pyridine, potassium carbonate, sodium carbonate, lithium carbonate, barium carbonate, calcium carbonate, magnesium carbonate, strontium carbonate, potassium hydroxide, sodium hydroxide, barium hydroxide, and calcium hydroxide.

13. A method of preparing the reaction product of an amino-s-triazine selected from the class consisting of benzoguanamine and melamine, and an alkylene carbonate selected from the class consisting of ethylene carbonate and propylene carbonate which comprises heating the admixed reactants to a temperature of about 75° C. to about 225° C. in the presence of a base.

14. The method of claim 13 wherein the base is a member of the class consisting of pyridine, potassium carbonate, sodium carbonate, lithium carbonate, barium carbonate, calcium carbonate, magnesium carbonate, strontium carbonate, potassium hydroxide, sodium hydroxide, barium hydroxide and calcium hydroxide.

15. The method of claim 14 wherein the reactants are benzoguanamine and propylene carbonate.

16. The method of claim 14 wherein the reactants are melamine and ethylene carbonate.

17. The method of claim 14 wherein the reactants are melamine and propylene carbonate.

References Cited by the Examiner

UNITED STATES PATENTS

| | | | |
|---|---|---|---|
| 2,546,551 | 3/1951 | Lento et al. | 23—75 |
| 2,997,459 | 8/1961 | Schnell et al. | 260—77.5 |

FOREIGN PATENTS 1,186,572   8/1959   France.

OTHER REFERENCES

Reimschussel et al.: J. Poly. Sci., 40, pp. 270–2 (1959).

Dickstein et al.: U.S. Dept. Comm., Office Tech. Service, AD 266,452, 47 pp. (1961).

LEON J. BERCOVITZ, *Primary Examiner.*

DONALD E. CZAJA, *Examiner.*

J. J. KLOCKO, *Assistant Examiner.*